United States Patent
Sugata et al.

(10) Patent No.: US 7,214,012 B2
(45) Date of Patent: May 8, 2007

(54) MULTI-SHAFT SPINDLE HEAD OF MACHINE TOOL

(75) Inventors: Shinsuke Sugata, Fukuyama (JP); Tadashi Makayama, Onomichi (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/533,949

(22) PCT Filed: Nov. 7, 2003

(86) PCT No.: PCT/JP03/14325

§ 371 (c)(1), (2), (4) Date: May 4, 2005

(87) PCT Pub. No.: WO2004/048029

PCT Pub. Date: Jun. 10, 2004

(65) Prior Publication Data

US 2005/0271484 A1 Dec. 8, 2005

(30) Foreign Application Priority Data

Nov. 25, 2002 (JP) .............................. 2002-340852

(51) Int. Cl.
*B23B 51/06* (2006.01)

(52) U.S. Cl. ........................ 409/136; 408/56; 408/57; 408/59; 184/6.14

(58) Field of Classification Search ................. 408/34, 408/53, 56, 57, 59; 184/6.14; 409/135, 409/136

See application file for complete search history.

(56) References Cited

U.S. PATENT DOCUMENTS

| 2,845,823 | A | * | 8/1958 | Ragnar ........................ 408/56 |
| 2,946,244 | A | * | 7/1960 | Maynard ..................... 408/1 R |
| 3,478,843 | A | * | 11/1969 | Eckardt ..................... 184/6.26 |
| 4,345,668 | A | * | 8/1982 | Gaunt .......................... 184/29 |
| 5,004,382 | A | * | 4/1991 | Yoshino ....................... 408/68 |
| 5,006,021 | A | * | 4/1991 | Wheetley .................... 408/1 R |
| 5,676,506 | A | * | 10/1997 | Sugata ........................ 409/136 |
| 6,602,031 | B2 | * | 8/2003 | Hara ........................... 409/131 |
| 6,773,212 | B2 | * | 8/2004 | Inoue .......................... 409/136 |
| 6,905,294 | B2 | * | 6/2005 | Sugata et al. ............... 409/136 |
| 6,926,478 | B2 | * | 8/2005 | Sugata et al. ............... 409/136 |
| 6,981,825 | B2 | * | 1/2006 | Sugata et al. ............... 409/136 |
| 2002/0033081 | A1 | * | 3/2002 | Hara ........................... 82/1.11 |
| 2003/0170087 | A1 | * | 9/2003 | Sugata et al. ............... 409/136 |
| 2004/0079207 | A1 | * | 4/2004 | Matsumara et al. .......... 82/158 |

FOREIGN PATENT DOCUMENTS

DE 4200808 A1 * 9/1993

(Continued)

*Primary Examiner*—Monica Carter
*Assistant Examiner*—Michael W. Talbot
(74) *Attorney, Agent, or Firm*—Merek, Blackmon & Voorhees, LLC (57) ABSTRACT

A multi-shaft spindle head, wherein a plurality of spindles (11) having tools at the tips thereof are disposed in the same direction, the rear ends of cutting fluid feed passages (21a) formed as the inner holes of cutting fluid feed tubes (21) installed in a non-rotating state at the rotating center parts of the spindles (11) are allowed to communicate with a common closed chamber (8) formed at the rear parts of the spindles (11), and atomized cutting fluid fed into the common closed chamber (8) is jetted from the tips of the openings at the rear end of the cutting fluid feed passages (21a).

8 Claims, 8 Drawing Sheets

FOREIGN PATENT DOCUMENTS

| | | | |
|---|---|---|---|
| DE | 19632472 A1 | * | 3/1997 |
| EP | 978350 A1 | * | 2/2000 |
| JP | 5-162046 | | 6/1993 |
| JP | 08243877 A | * | 9/1996 |
| JP | 3060856 U | * | 6/1999 |
| JP | 11235641 A | * | 8/1999 |
| JP | 2001150295 A | * | 6/2001 |
| WO | WO 9937439 A1 | * | 7/1999 |

* cited by examiner

PREFERRED EMBODIMENT OF THE INVENTION

The present invention will be explained particularly with reference to the drawings as follows.

Figure 1:
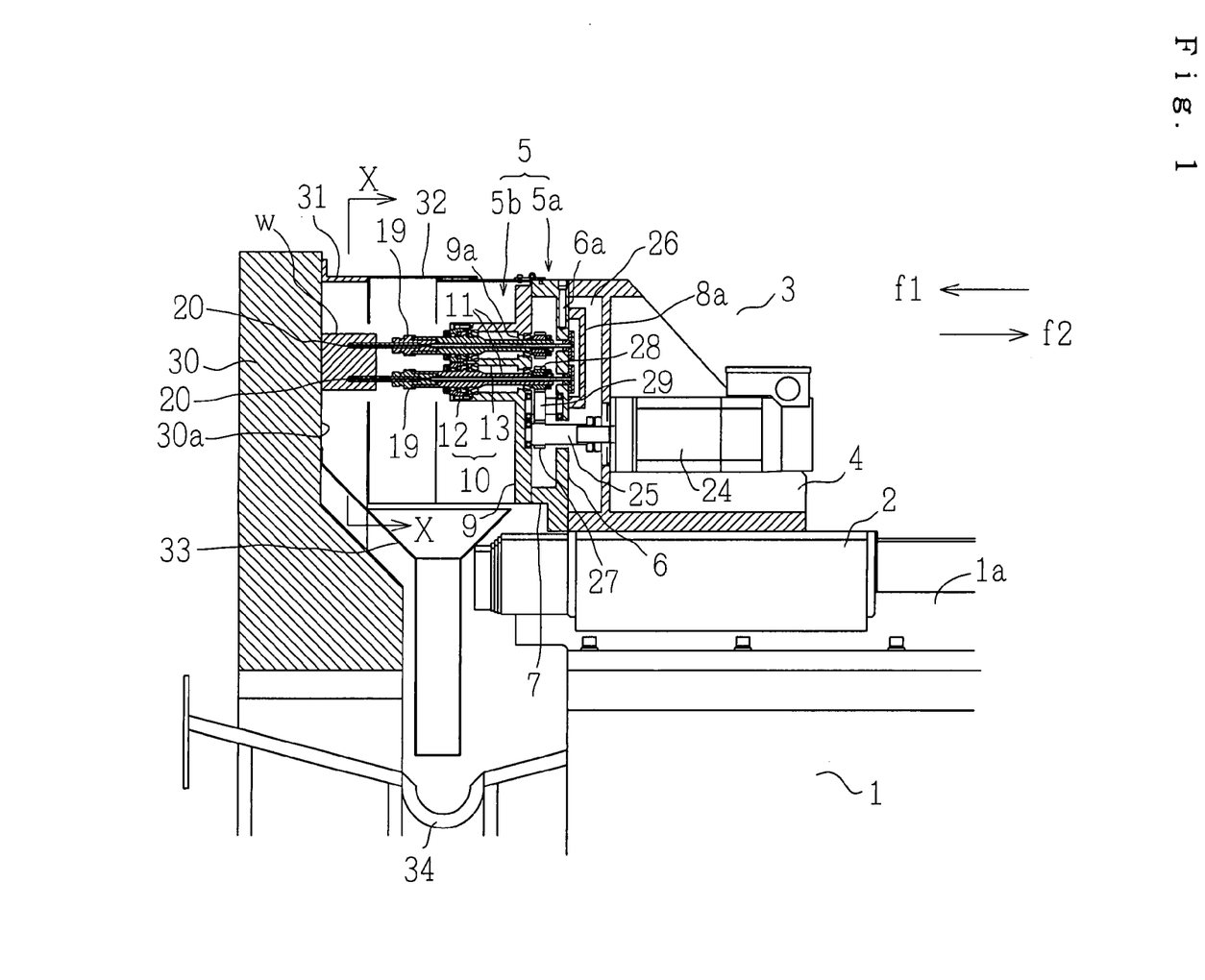
Figure 2:
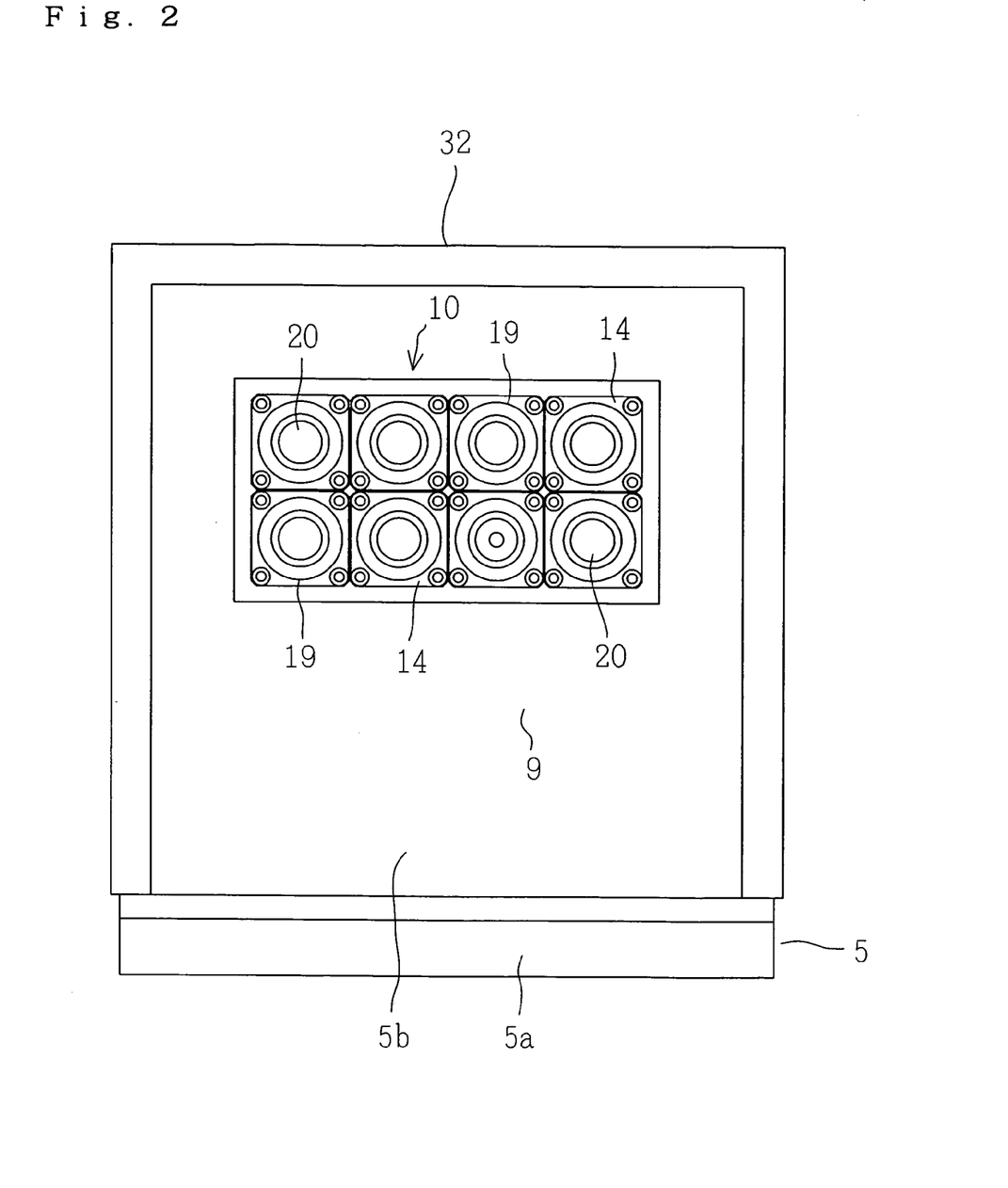
Figure 3:
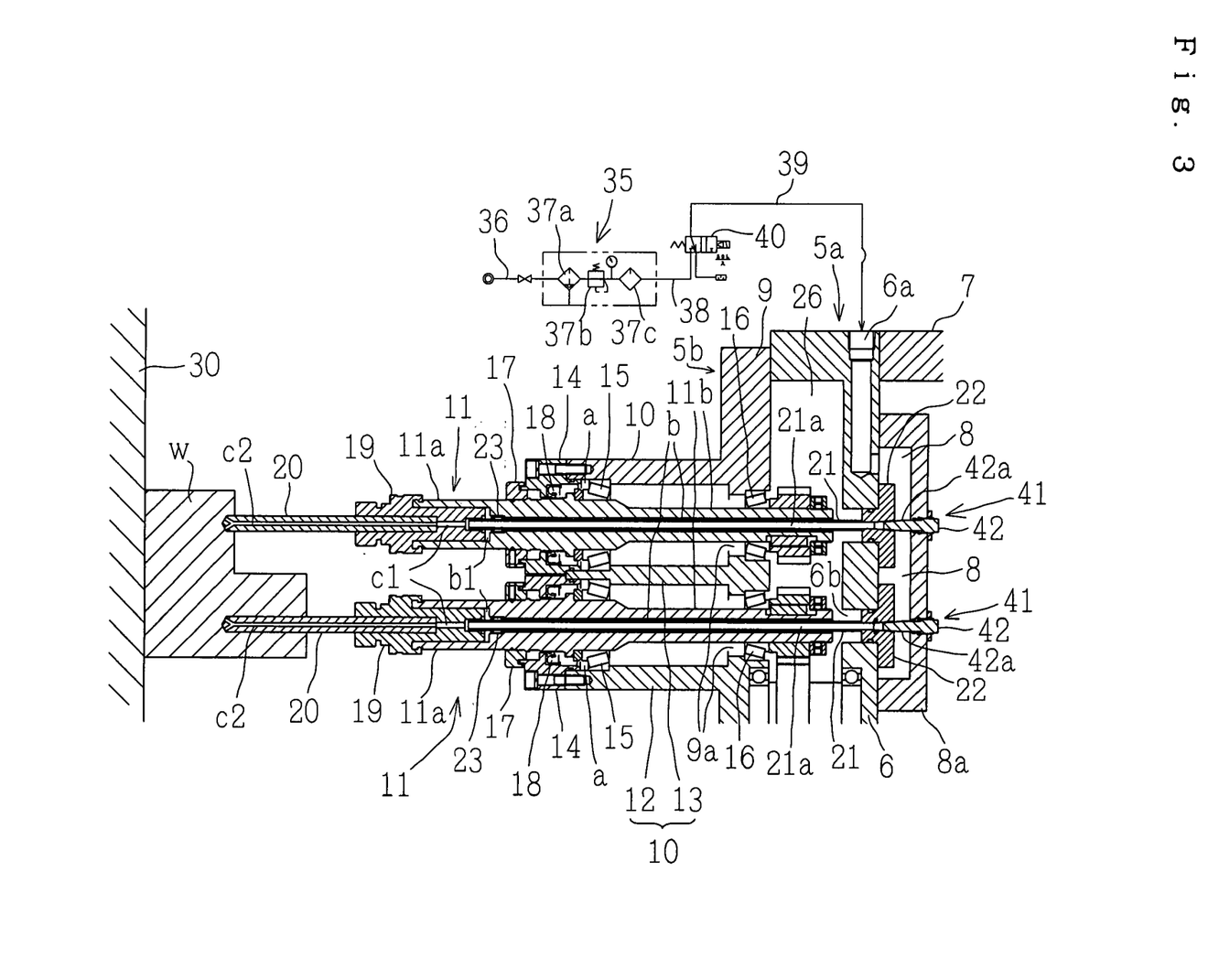

In FIG. 1, FIG. 2 and FIG. 3, 1 is a bed, 2 is a moving table installed movably in a front direction f1 and a rear direction f2 through a guide rail 1a on the upper face of the bed 1, and 3 is a multi-shaft spindle head fixed on the upper face of the moving table 2.

The multi-shaft spindle head 3 is concretely constructed as follows.

That is, the multi-shaft spindle head 3 comprises a head frame 4 fixed on the moving table 2 and a spindle part 5 having a rear case frame 5a and a front case frame 5b on the front face of the frame 4.

The rear case frame 5a comprises a standing wall part 6 and a sidewall part 7. And to a thickness part of the standing wall part 6, a feed passage 6a is formed to feed atomized cutting fluid from the outside. And to the rear face of the standing wall part 6, a surrounding wall 8a for forming a common closed chamber 8 is fixedly bolted. In this case, the feed passage 6a communicates with the inside of the closed chamber 8.

The front case frame 5b comprises a standing wall part 9 and a spindle case part 10. The standing wall part 9 is fixedly bolted to the rear case frame 5a In front of the closed chamber 8, as shown in FIG. 3, a though hole 9a for inserting a spindle 11 therein is formed for each spindle 11.

The spindle case part 10 comprises a rectangular external wall part 12 for surrounding a plurality of spindles 11 and an intermediate wall part 13 for surrounding each spindle 11 thereinside.

On the front face of the external wall part 12, as shown in FIG. 3, a circular through hole 'a' is formed so as to correspond to each spindle 11. And to the front face thereof, a front end cover 14 into which the spindle 11 is inserted is fixedly bolted.

Each of the spindles 11 comprises a forward large diameter part 11a and a rearward narrow diameter part 11b, rotatably supported at a fixed position on the front case frame 5b, with a bearing 15 and a bearing 16 interfitted to the through hole 'a' and the through hole 9a, respectively. A straight center hole 'b' is formed in a center axial direction of each spindle 11, and the front part of the center hole 'b' forms a double-level large diameter part b1.

Here, a member 17 for covering the front face of the front end cover 14 is fixed to each spindle 11, and an oil seal 18 is interfitted into the front end cover 14.

A tool support cylindrical member 19 is fixedly interfitted to the fixed position of the large diameter part b1 of the center hole 'b', and a tool 20 is arranged in the cylindrical member 19. Then, passage holes c1, c2 are respectively formed in the center axial directions of the center parts of the cylindrical member 19 and the tool 20.

Into the center hole 'b' of each spindle 11, a straight cutting fluid feed tube 21 having a narrower diameter than the center hole 'b' is provided concentrically therewith. The rear end of the feed tube 21 is arranged in a hole 6b formed in the standing wall part 6 of the rear case frame 5a, fixed to the standing wall part 6 through a binding part 22 or a packing. A cutting fluid feed passage 21a of an inner hole of the feed tube 21 airtightly communicates with the inside of the closed chamber 8. The front end of the feed tube 21 is almost airtightly inserted into the passage hole c1 of the cylindrical member 19 through the rear end of the large diameter part b1 of the center hole 'b'.

In this case, a roller bearing 23 is provided between the front end of the feed tube 21 and the large diameter part 11a of the spindle 11, contributing to smooth rotation of the spindle 11 so that rotation is not prevented by the feed tube 21.

The spindles 11 are respectively driven by a spindle driving motor 24 installed on the head frame 4 in FIG. 1.

That is, a driving shaft 25 connecting with an output axis of the motor 24 is arranged in a gear chamber 26 surrounded by the frames 5a, 5b rotatably at the fixed position, and a driving gear 27 is formed on the tip of the driving shaft 25. On the other hand, in the gear chamber 26, a driven gear 28 is fixed to the rear end of the spindle 11, interlocked and connected with the driving gear 27 by a gear row comprising a plurality of intermediate gears 29.

In front of the multi-shaft spindle head 3, a fixing table for work piece 30 is provided so as to form a constant configuration against the bed 1. In this case, a surrounding frame member 31 is fixed around a face for supporting work piece 30a thereof.

A cover device 32 is installed so as to extend in the front direction f1 and the rear direction f2, closely abutted to the surrounding frame member 31 to surround a work piece and the front part of the multi-shaft spindle head 3 in which the underside only is open.

A hopper guide passage 33 is to guide cutting chips and cutting fluid, the hopper guide passage being arranged so as to cover the underside of the cover device 32. A guide device 34 is to guide cutting fluid dropped from the hopper guide passage 33 to a desirable area.

In FIG. 3, 35 is a cutting fluid atomizing device for generating atomized cutting fluid, comprising a compressed air feed tube 36, a filter 37a, a pressure adjuster 37b, an atomizing device 37c and a cutting fluid transmitting tube 38. The transmitting tube 38 is communicated with the feed passage 6a through a pipeline 39. Besides, in the middle of the transmitting tube 38, an electromagnetic valve 40 is provided so as to timely open and close through a not-illustrated control unit.

Next, characteristic structure of the present invention will be explained with reference to FIGS. 4 to 6.

Figure 4:
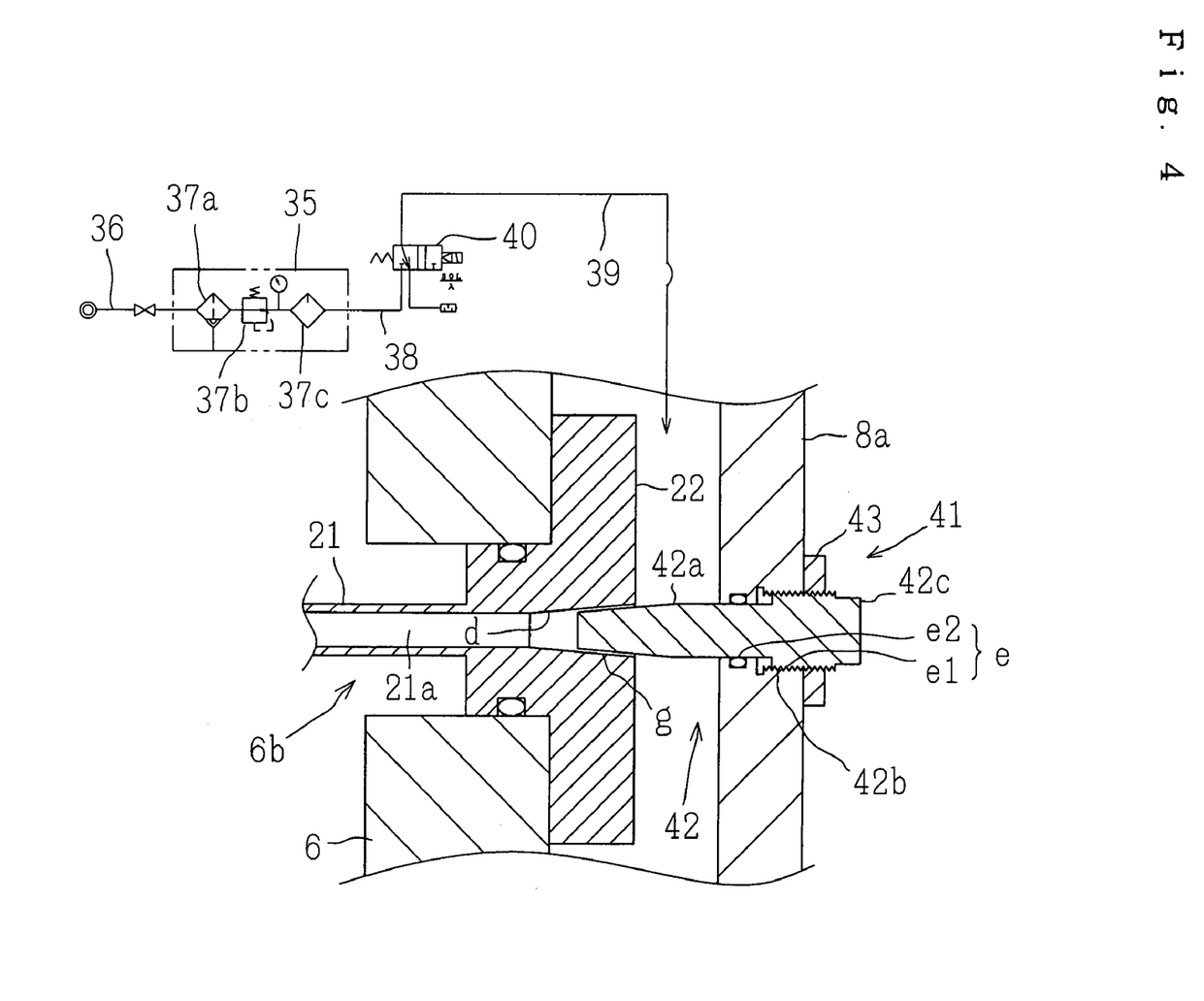

As shown in FIG. 4, at the rear part of the feed passage 21a, an opening degree change means 41 is formed to change the degree of opening at the rear end of the feed passage 21a The opening degree change means 41 comprises an inserted member 42, which has a taper part 42a inserted from the opening at the rear end of the feed passage 21 a concentrically therein.

As shown in FIG. 4, the inserted member 42 whose rear part is made a male thread part 42b, and besides, a rotational input part 42c for imparting torque throughout with a spanner engaged is formed at the rear end of the thread part 42b.

On the other hand, a through hole 'e' comprising a longitudinal female thread part e1 and a seal part e2 is formed in the surrounding wall 8a, a portion of which is opposite to a taper hole part 'd' forming an opening at the rear end of the feed passage 21a The inserted member 42 is fixed through the female thread part e1. In installing the inserted member 42, the taper part 42a is inserted from the rear of the surrounding wall 8a into the closed chamber 8 through the through hole 'e', a part of thereof being continuously inserted in the rear end of the feed passage 21a Then, the male thread part 42b is screwed in the female thread part e1 by a desirable length, and thereafter, a lock nut 43 is screwed into the male thread part 42b to join the male thread part 42b and the female thread part e1. In this case, the taper part 42a is supported almost concentrically with the taper hole part 'd'.

The degree of the opening at the taper hole part d is adjusted by displacing the longitudinal position of the taper part 42a against the feed passage 21a by rotating the male thread part 42b. Concretely, the male thread part 42b can be displaced forward relative to the female thread part e1, thereby gradually diminishing the width of a circular passage g formed between the feed passage 21a and the taper part 42a Conversely, the male thread part 42b can be displaced rearward relative to the female thread part e1, thereby gradually increasing the width.

Figure 5:
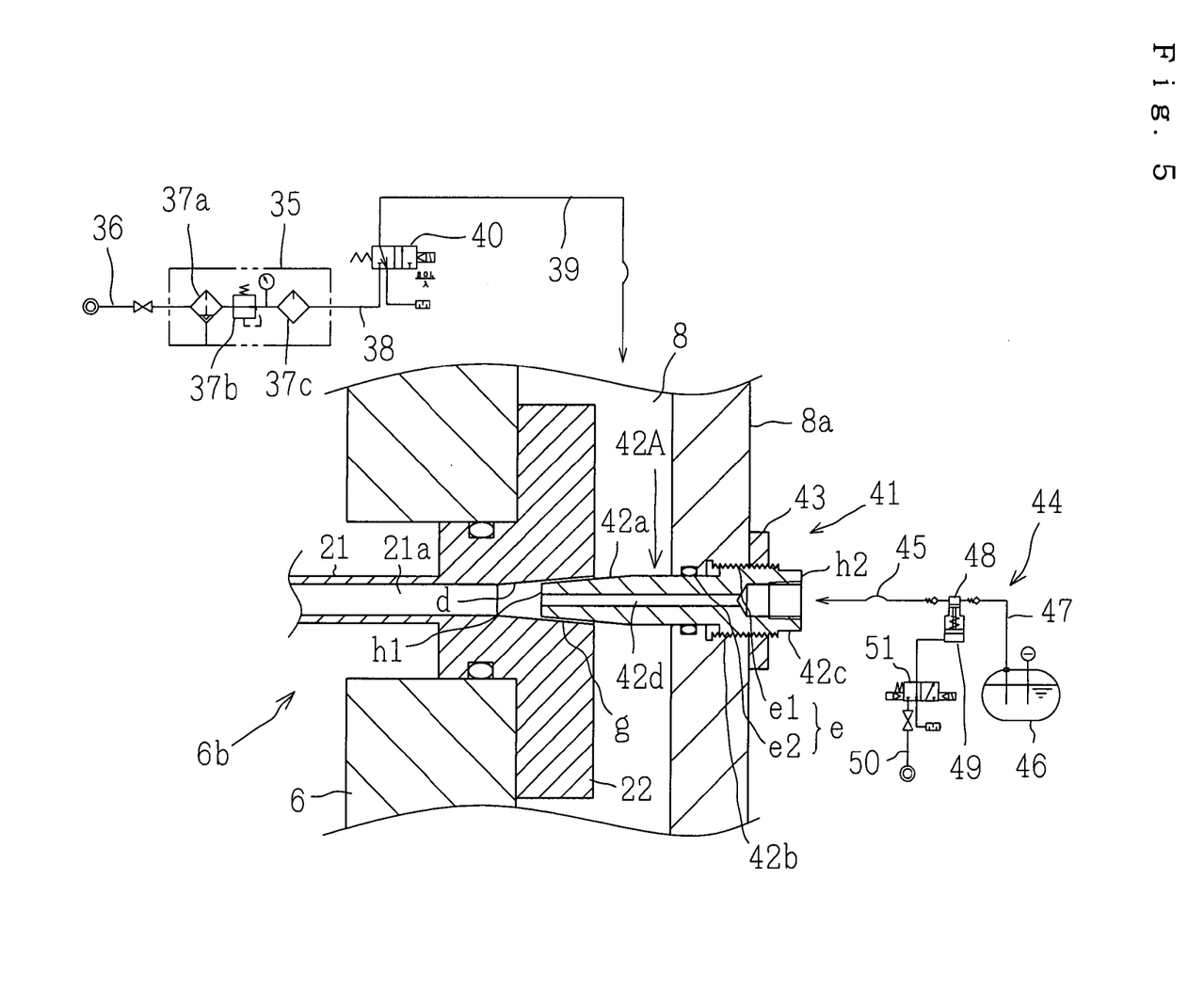

The inserted member 42 may be transformed into an inserted member 42A as shown in FIG. 5, namely, having a cutting fluid supply passage 42d extending from the front end face h1 of the thickness part thereof to the rear end face h2. And to the supply passage 42d, a normal cutting fluid feed tube 45 elongated from a normal cutting fluid feed device 44 is connected.

The cutting fluid feed device 44 comprises a cutting fluid tank 46, a reciprocating pump 48, and an air pressure reciprocating cylinder device 49 and a magnetic valve 51. Here, the tank 46 is to store normal cutting fluid, and the pump 48 sucks and discharges a fixed amount of the normal cutting fluid from the tank 46 into the supply passage 42d through a suction tube 47, repeatedly. The cylinder device 49 is to reciprocatively drive the pump 48. The magnetic valve 51 is provided on a compressed air feed tube 50 connected to the cylinder device 49 to timely open and close through a not-illustrated control device. The normal cutting fluid is fed into the feed tube 21 through the magnetic valve 51. Besides, an operational velocity of the pump 48 is changed in accordance with an open and close velocity of the magnetic valve 51 to change the flow rate of the normal cutting fluid.

Figure 6:
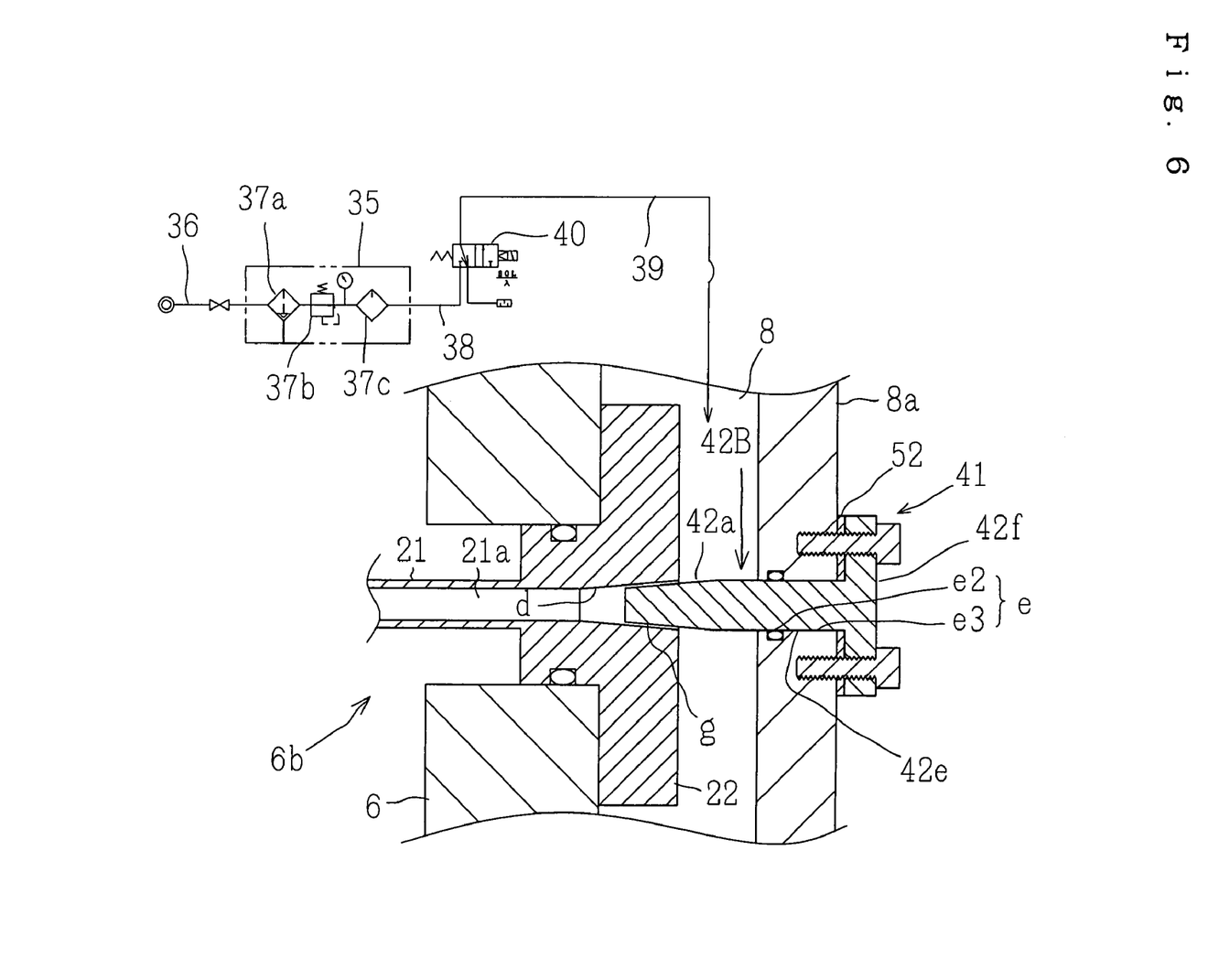
FIG. 6 is a sectional view seen from the side of another modification thereof.

Besides, the inserted member 42 may be transformed to an inserted member 42B as shown in FIG. 6. That is, therein, the male thread part 42b forms a round bar part 42e and a flange part 42f is formed at the rear end thereof The inserted member 42B is so fixed that a portion for the female thread part e1 of the surrounding wall 8a forms a simple circular hole part e3, the taper part 42a is inserted from the rear side of the hole part e3 into the closed chamber 8 and the rear end part of the feed tube 21, the round bar part 42e is arranged in the hole part e3, the flange part 42f is abutted on the outer face of the surrounding wall 8a, and the flange part 42f is fastened to the surrounding wall 8a with bolts The degree of the opening 'd' at the rear end of the feed passage 21a is adjusted by changing the longitudinal position of the taper part 42a against the feed passage 21a so as to change the thickness of a spacer 52 which is installed between the outer face of the surrounding wall 8a and the flange part 42f Concretely, the thickness of the spacer 52 can be reduced, thereby reducing the width of a circular passage 'g' formed between the feed passage 21a and the taper part 42a. Conversely, the thickness thereof can be enlarged, thereby enlarging the width thereof.

An example of the use and operation of the above-mentioned embodiment will be explained as follows.

Figure 7:
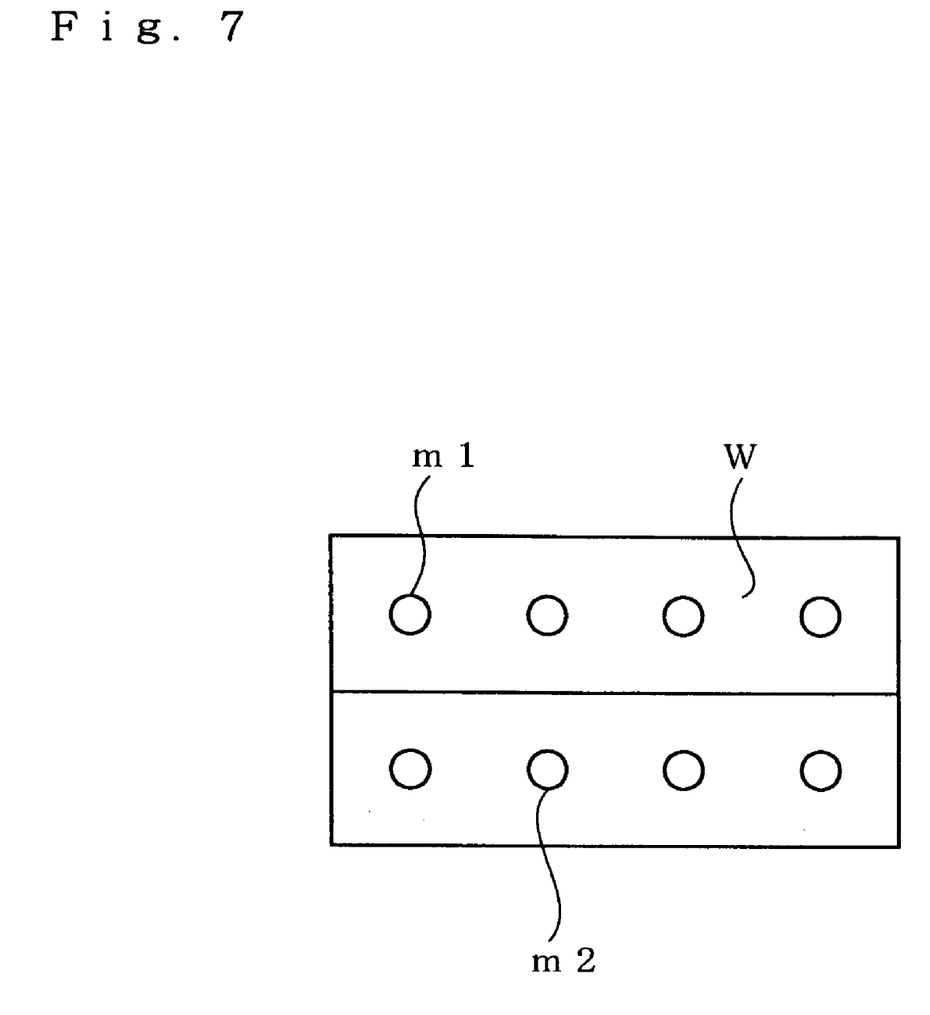
FIG. 7 is a front view showing a machining state of a work piece.

FIG. 7 is a front view of a work piece in a machining operation. As shown in FIG. 7, four comparatively shallow holes m1 are bored on the upper front face of a rectangular work piece w, and four comparatively deep holes m2 are bored on the lower front face thereof. Empirically or from the result of previous experimental machining, it is identified that the flow rate of the cutting fluid for machining the shallow holes m1 is preferably about 10 ml per hour and that of the deep holes m2 is preferably about 50 ml per an hour.

In this case, a worker unfastens the lock nut 43 and gives rotational power to the rotation-input part 42c with a spanner to rotate the inserted member 42, as necessary. According to this, the longitudinal position of the inserted member 42 is adjusted so that the flow rate of the cutting fluid from the tool 20 is made the fixed flow rate correspondent to the machining holes m1, m2. And the lock nut 43 is fastened so as to keep the longitudinal position.

On the other hand, the moving table 2 is displaced from the position of FIG. 1 in the rear direction f2, and the work piece w is fixed on the supporting face 30a of the fixing table 30.

Next, the motor 24 is operated. According to this, rotation of the motor 24 is communicated with the spindles 11 through the gears 27, 29, 28, and the spindles 11 are guided by the bearings 15, 16 to rotate smoothly. During this rotation, since the feed tubes 21 are fixed on the standing wall part 6, they are kept in a non-rotatable condition.

Then, the magnetic valve 40 is opened with relation to the operation of the motor 24. According to this, the compressed air fed from the compressed air feed tube 36 flows in the atomizing device 37c to generate atomized cutting fluid on an atomizer principle.

Thus generated atomized cutting fluid arrives in the closed chamber 8 through the feed passage 6a, being fed therefrom into the feed tubes 21 through the taper hole parts 'd' of the rear end parts thereof, continuously flowing out in the front direction f1. In this case, the degree of opening of the taper hole parts 'd' is suitably adjusted by the inserted members 42 of the opening degree changing means 41. Since the feed tube 21 is non-rotatable, the atomized cutting fluid forwardly flowing in the feed tube 21 is not affected by centrifugal force on rotation even if the spindles 11 rotate at high speed. Accordingly, in the feed tube 21, liquefaction is not caused by centrifugal force, and a component separating phenomena is caused by differences between specific gravities of components thereof, thereby keeping the atomized cutting fluid in an equally distributed manner.

The cutting fluid in the feed tube 21 flows out from the front end thereof, arriving at the passage hole c1 of the cylindrical member 19, continuously jetting from the tip of the tool 20 through the passage hole c2 thereof Under this condition, the moving table 2 is displaced to the front f1. When the displacement is over a fixed value, the tip of the tool 20 reaches the work piece 'w' to machine it. During this machining, since the fixed amount of the atomized cutting fluid jetting from the tip of the tool 20 corresponds to the holes m1, m2, the machining portion of the tool 20 turns to be equally-effectively lubricated.

In the above-mentioned example, when further deeply machining only a part of the holes m1, m2, the flow rate of the cutting fluid must be broadly increased corresponding to the holes m1, m2, for example, to about 150 ml per hour. In this case, the inserted member 42 corresponding to the holes m1, m2 is exchanged with the inserted member 42A shown in FIG. 5.

Then, in connection with the operation of the magnetic valve 40 in the above-mentioned example, a different magnetic valve 51 is also operated at a suitable speed. According to this, the atomized cutting fluid fed into the closed chamber 8 flows into the feed tube 21 through the circular passage 'g'. And at the same time, the fixed flow rate of normal cutting fluid in the tank 46 is fed into the supply passage 42*d* through the pump 48 to be supplied from the opening of the front end face h1 of the inserted member 42A in the feed tube 21 in a normal liquid manner.

Accordingly, the flow rate of the cutting fluid flowing in the feed tube 21 becomes, for example, 150 ml per an hour. The cutting fluid supplied from the supply passage 42*d* is refined and equally dispersed by a flow energy of the atomized cutting fluid symmetrically and powerfully flowing from the circular passage 'g' into the feed tube 21. And thereafter, it stably jets from the tip of the tool 20 with the atomized cutting fluid flowing from the circular passage 'g'.

When the cutting fluid is supplied from the passage 42*d*, since it is not done in an atomized manner but in a normal liquid manner, the flow rate thereof is variously changed to greatly change the flow rate of the cutting fluid jetted from the tip of the tool 20. Accordingly, even if the flow rate of the cutting fluid fed through the circular passage 'g' is about 50–60 ml per hour, that of the cutting fluid jetted from the tip of the tool 20 is easily made about 500–600 mp per hour.

The inserted member 42 in the above-mentioned example may be changed to an inserted member 42B shown in FIG. 6. In this case, since the inserted member 42B is positioned by the round bar part 42*e* and the circular hole part e3, the position is exactly maintained in comparison with the inserted members 42, 42A that are positioned by the male thread part 42*b* and the female thread part e1. Accordingly, the concentricity between the taper part 42*a* of the inserted member 42B and the taper hole part 'd' improves, thereby better equaling and stabilizing the flow rate of the atomized cutting fluid in the feed tube 21.

Figure 8:
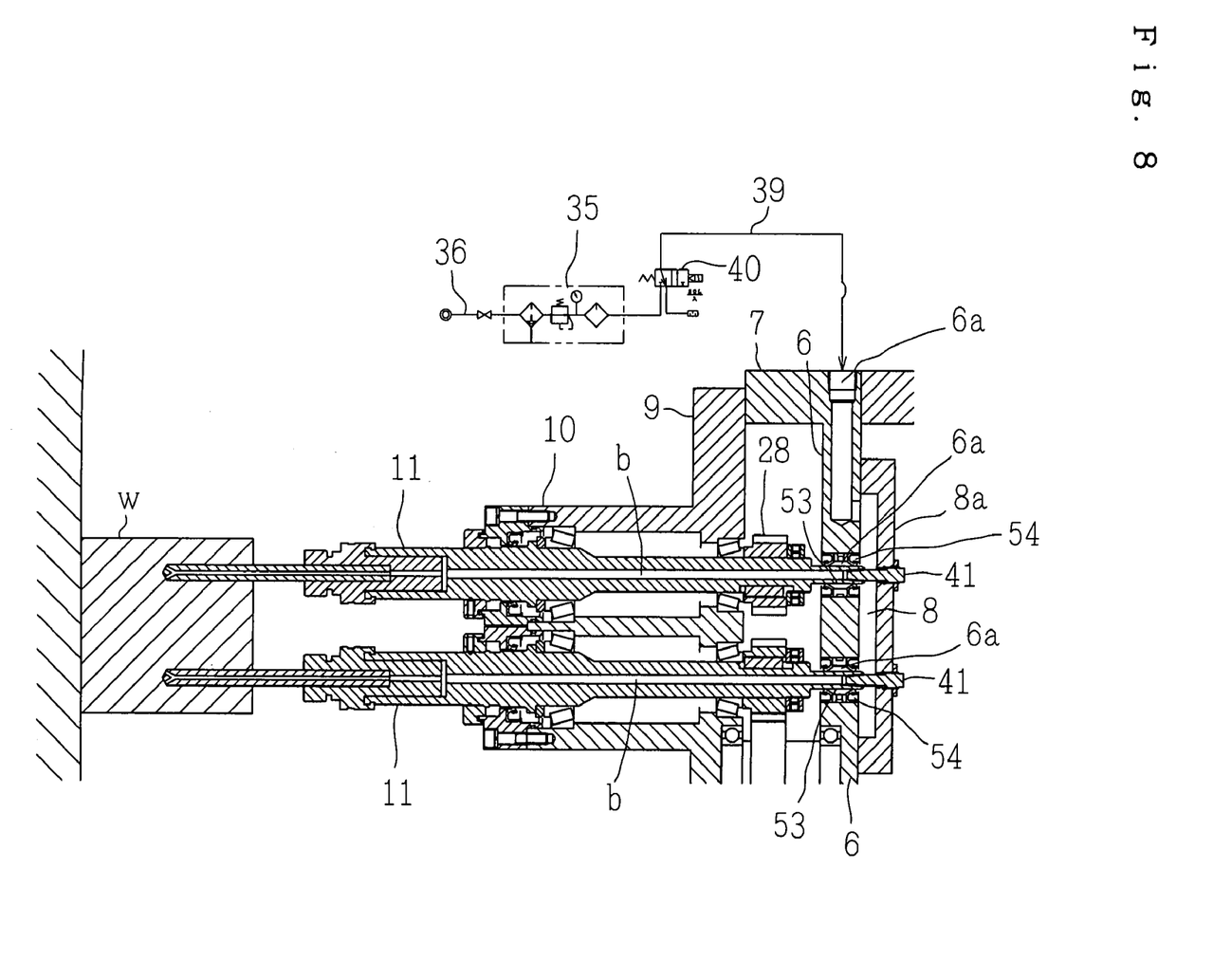
FIG. 8 is a side view of a multi-shaft spindle head related to the modification of the above-mentioned example.

The above-mentioned example can be modified as shown in FIG. 8. Here, FIG. 8 is a side view of a multi-shaft spindle head related to the modification of the above-mentioned example.

In the modification, the feed tube 21 is not provided. Instead of it, a narrow diameter shaft part 53 is rearwardly extended from the rear end of the spindle 11 to arrange the rear end thereof in the closed chamber 8 through the through hole 6*a* of the standing wall part 6. Besides, the center hole b of the spindle 11 is extended to the rear end of the narrow diameter shaft part 53. Further, a seal member 54 is provided for keeping a space between the inside face of the through hole 6*a* and the outer face of the narrow diameter shaft part 53 in an airtight manner under the condition that rotation of the narrow diameter shaft part 53 is permitted.

The spindle 11 and the center hole 'b' of the narrow diameter shaft part 53 are used as the feed passage 21*a*, and an opening degree changing means 41 is formed at the tip of the passage 21*a* equally with the above-mentioned example. The multi-shaft spindle head is so constructed that the atomized cutting fluid fed into the closed chamber 8 jets from the tip of the tool 20 through the feed passage 21*a*.

In the modification, since the feed passage 21 a rotates integrally with the rotating spindle 11, centrifugal force affects the atomized cutting fluid flowing in the feed passage 21*a* to cause liquefaction. However, as long as the spindle 11 is not rotated at high speed, the liquefaction is within the permitted range.

INDUSTRIAL APPLICABILITY

According to the present invention, there are the following effects. By feeding the atomized cutting fluid having the fixed pressure into the common closed chamber, the cutting fluid can be equally jetted from the tips of the tools of the spindles, thereby enabling each spindle to machine highly accurately and efficiently.

Besides, by feeding the atomized cutting fluid having the fixed pressure from the non-rotatable cutting fluid feed tube into the common closed chamber, the cutting fluid can be equally jetted from the tips of the tools of the spindles. In addition, even if the spindles are rotated at high speed, the atomized cutting fluid flowing therein can be prevented from liquefaction. Therefore, the spindles can respectively machine highly accurately and efficiently.

Moreover, by displacing the position of the taper part in the longitudinal direction, the degree of opening at the tear end of the cutting fluid feed passage can be changed to small or large. In addition, in the opening at the rear end of the cutting fluid passage, the circular passage is formed on the outer portion of the taper part to make the flow of the atomized cutting fluid therein fair.

Furthermore, the inserted member can be easily exchanged and removed, and the broad change in the degree of opening at the rear end of the cutting fluid feed passage can be easily performed.

Besides, changing and adjusting of the degree of opening at the rear end of the cutting fluid feed passage by the opening degree change device can be easily performed.

Moreover, the normal cutting fluid can be supplied from the cutting fluid supply passage into the cutting fluid feed passage, and a part of the supplied normal cutting fluid can be efficiently grained by the flowing energy of the atomized cutting fluid flowing from the common closed chamber into the cutting fluid feed passage and stably displaced to the tips of the tools. In addition, the flow rate of the cutting fluid jetted from the tips of the tools by supplying the normal cutting fluid can be broadly changed at a stroke.

The invention claimed is:

1. A multi-shaft spindle head of a machine tool comprising:
   a plurality of spindles having tools at tips thereof disposed in a same direction;
   cutting fluid feed passages provided at rotating centers of the spindles;
   a common closed chamber provided at rear parts of the spindles, wherein rear ends of said cutting fluid feed passages are allowed to communicate with said common closed chamber, whereby atomized lubricant flows into the cutting fluid passages at a flow rate, and atomized lubricant fed to the common closed chamber is adapted to jet from the tips of the corresponding tools through the cutting fluid feed passages; and
   opening degree changing means for changing the degree of opening of plural openings at the rear ends of the cutting fluid feed passages to change the flow rate of atomized lubricant into the cutting fluid feed passages.

2. A multi-shaft spindle head of a machine tool comprising:
   a plurality of spindles having tools at tips thereof disposed in a same direction;
   cutting fluid feed passages formed as inner holes of cutting fluid feed tubes installed in a non-rotating state at rotating centers of the spindles;
   a common closed chamber provided at rear parts of the spindles, wherein rear ends of said cutting fluid feed passages are allowed to communicate with said common closed chamber, whereby atomized lubricant flows into the cutting fluid passages at a flow rate, and atomized lubricant fed to the common closed chamber is adapted to jet from the tips of the corresponding tools through the cutting fluid feed passages; and opening degree changing means for changing the degree of opening of plural openings at the rear ends of the cutting fluid feed passages to change the flow rate of atomized lubricant into the cutting fluid feed passages.

3. A multi-shaft spindle head of a machine tool as claimed in claim 1, wherein said opening degree changing means is provided with inserted members each having a taper part concentrically inserted into the openings at the rear ends of said cutting fluid feed passages.

4. A multi-shaft spindle head of a machine tool as claimed in claim 3, wherein said inserted members are fixed on a wall for surrounding a rear side of said common closed chamber so as to be detachable from an outer surface of the wall.

5. A multi-shaft spindle head of a machine tool as claimed in claim 3, wherein the inserted members have a longitudinal position with respect to the cutting fluid feed passages, and the longitudinal position of said inserted members is changed and adjusted from outside said common closed chamber.

6. A multi-shaft spindle head of a machine tool as claimed in claim 2, wherein said opening degree changing means is provided with inserted members each having a taper part concentrically inserted into the openings at the rear ends of said cutting fluid feed passages.

7. A multi-shaft spindle head of a machine tool as claimed in claim 6, wherein said inserted members are fixed on a wall for surrounding a rear side of said common closed chamber so as to be detachable from an outer surface of the wall.

8. A multi-shaft spindle head of a machine tool as claimed in claim 4, wherein the inserted members have a longitudinal position with respect to the cutting fluid feed passages, and the longitudinal position of said inserted members is changed and adjusted from outside said common closed chamber.

* * * * *